Jan. 22, 1957 — A. L. FRANKS — 2,778,702
CONTAINER HOLDER
Filed March 15, 1955 — 2 Sheets-Sheet 2
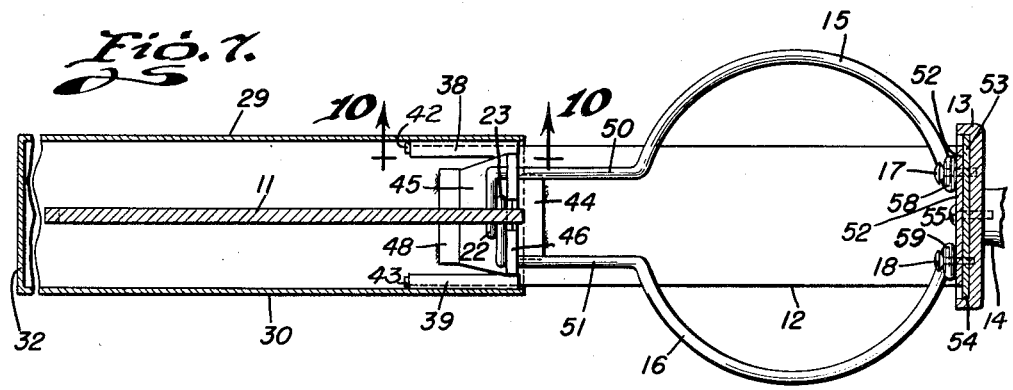
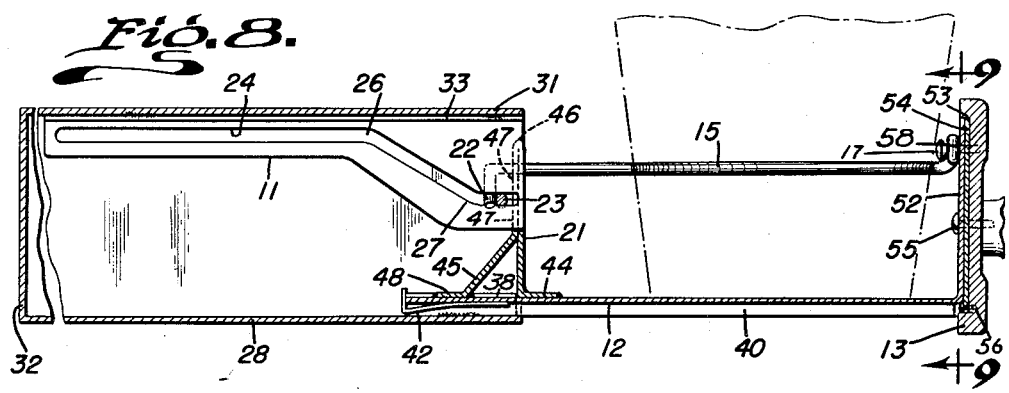
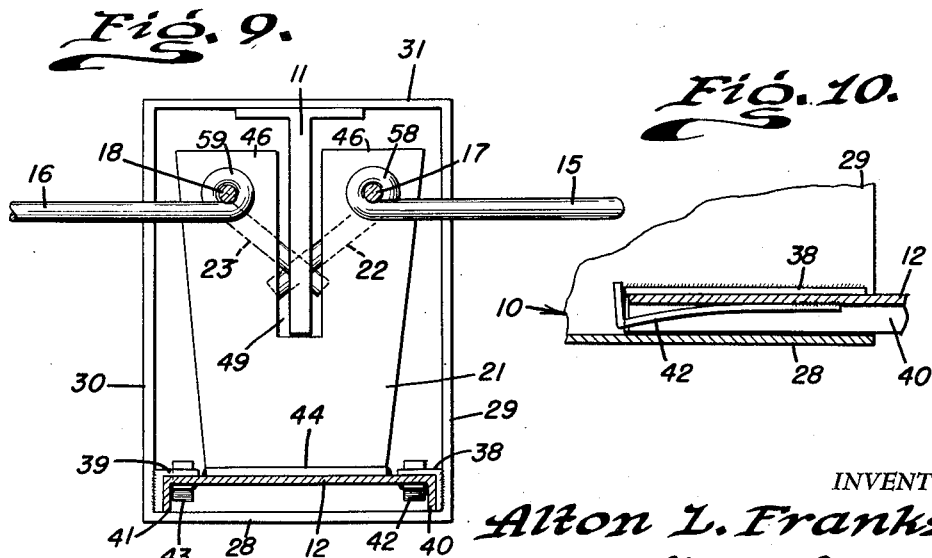
INVENTOR.
Alton L. Franks

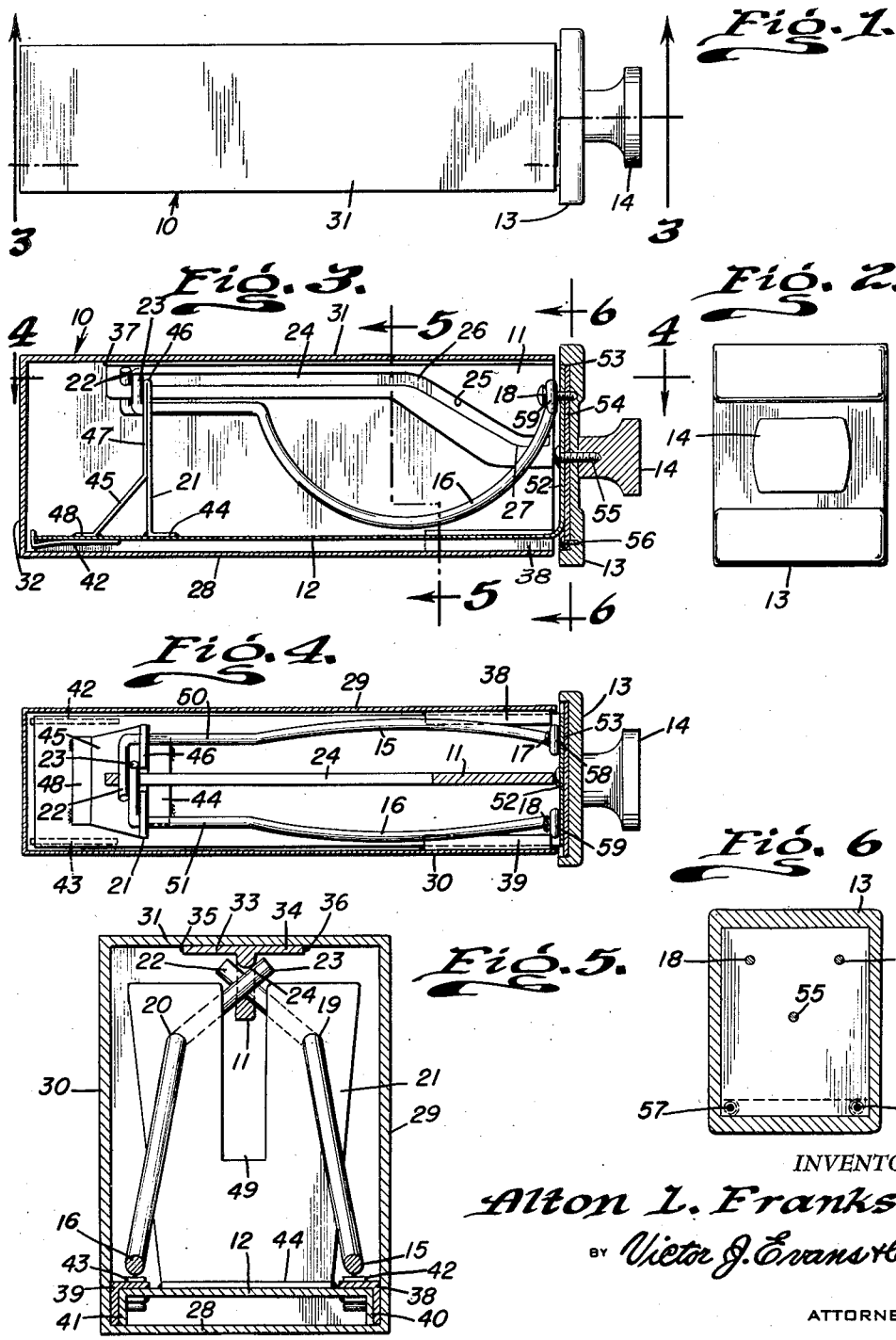

United States Patent Office 2,778,702
Patented Jan. 22, 1957

2,778,702

CONTAINER HOLDER

Alton L. Franks, Lantana, Fla.

Application March 15, 1955, Serial No. 494,409

6 Claims. (Cl. 312—242)

This invention relates to collapsible or folding container holders particularly adapted to be incorporated in an instrument panel of a motor vehicle, and in particular, a tray slidably mounted in an elongated rectangular shaped casing and having semi-circular loops formed of wire or small rods with arms extended from ends thereof whereby in withdrawing the tray from a position nested in the casing to an extended position the loops are actuated to horizontally disposed positions providing sides of a circular element for retaining a container, such as a glass or the like on the tray and, upon sliding the tray into the casing, the loops are folded downwardly to nested positions on the tray.

The purpose of this invention is to provide a collapsible holder for a container, such as a glass or bottle, that occupies comparatively little space in an instrument panel of a motor vehicle when not in use and that is readily adapted to be drawn outwardly, such as an ash tray, when use thereof is desired.

Various attachments and other devices have been provided in combination with instrument panels of motor vehicles, however, it is substantially impossible to place a cup or glass of water, or the like, on a surface in or around an instrument panel of a vehicle so that an operator may have drinking water in a glass or cup, particularly when driving in hot or humid climates. With this thought in mind, this invention contemplates an extensible holder for a glass or other container whereby an operator of a motor vehicle may have a place to set a glass or cup when use of both hands on the steering wheel is required.

The object of this invention is, therefore, to provide means for forming a collapsible container holder so that the device may be installed in an instrument panel of a motor vehicle.

Another object of the invention is to provide a folding container holder that is adapted to be installed in an instrument panel of a motor vehicle in which the device automatically opens to a position for holding a container as it is drawn outwardly to an extended position on the instrument panel.

A further object of the invention is to provide a collapsible container holder particularly adapted for use in a motor vehicle in which the holder is of a simple and economical construction.

With these and other objects and advantages in view, the invention embodies an elongated casing, rectangular shaped in cross section and having a centrally disposed partition with a slot having an inclined section therein extended lengthwise of the casing, and a tray having semi-circular loops pivotally mounted thereon slidably mounted in the casing and positioned with ends of the loops extended into the slot of the partition of the casing whereby upon outward movement of the tray the ends of the loops following the slot of the partition actuate the loops to horizontally disposed positions.

Other features and advantages of the invention will appear from the following description, taken in connection with the accompanying drawings, wherein:

Figure 1 is a plan view of the container holder showing the device with a tray positioned in a casing of the holder.

Figure 2 is an end elevational view showing the outer end of the tray of the holder.

Figure 3 is a longitudinal section through the container holder taken on line 3—3 of Figure 1.

Figure 4 is a sectional plan through the device taken on line 4—4 of Figure 3.

Figure 5 is a vertical cross section through the container holder taken on line 5—5 of Figure 3, the parts being shown on an enlarged scale.

Figure 6 is a vertical section through a facing plate of the tray of the container holder taken on line 6—6 of Figure 3.

Figure 7 is a sectional plan through the container holder similar to that shown in Figure 4 with the tray shown in an extended position and with parts broken away.

Figure 8 is a longitudinal section through the device taken substantially on line 3—3 of Figure 1 showing the container holder with the tray extended and also with parts broken away.

Figure 9 is a cross section through the device taken on line 9—9 of Figure 8 being substantially the same as that shown in Figure 5 also with the parts shown on an enlarged scale and showing the positions of the loops with the tray extended.

Figure 10 is a vertical section through the outer portion of the casing taken on line 10—10 of Figure 7 showing a spring latch for limiting outward movement of the tray.

Referring now to the drawings, wherein like reference characters denote corresponding parts, the improved container holder of this invention includes a casing, generally referred to by the numeral 10 and having a centrally positioned vertically disposed partition 11 therein, and a tray having a bottom 12 and a face plate 13 slidably mounted in the casing. A knob 14 is provided on the outer surface of the face plate and substantially semi-circular loops 15 and 16 are pivotally mounted on the tray with ends thereof on screws 17 and 18 at the back of the face plate, and with sections in openings 19 and 20 of an inner plate 21 at the opposite end of the tray, and the loops are provided with ends 22 and 23 that extend into a slot 24 of the partition 11 whereby as the tray is drawn outwardly the ends 22 and 23 follow an inclined section 25 of the slot which extends from a point 26 to a point 27 downwardly whereby upon reaching the extended position, as illustrated in Figures 7 and 8, the loops 15 and 16 are moved upwardly to horizontally disposed positions, also as shown in Figure 9.

The casing 10 is provided with a base 28, side walls 29 and 30, a panel 31 at the top and a rear end wall 32 which provides a closure for the inner end, the outer end being open.

The partition 11 in which the slot 24 is positioned is provided with flanges 33 and 34 which are secured to the top panel 31, such as by welding, as indicated at points 35 and 36. The partition extends from the forward or open end inwardly to point 37 in Figure 3.

The casing 10 is also provided with clip angles or guides 38 and 39 and flanges 40 and 41 extended downwardly from edges of the bottom 12 of the tray are free to slide in the clip angles 38 and 39 as the tray is drawn outwardly and returned to the nested or collapsed position within the casing. The bottom of the tray is provided with spring clips 42 and 43 particularly as illustrated in Figure 10 which extend upwardly above the bottom 12 and engage inner ends of the clips 38 and 39 to limit outward movement of the tray. The clips 38 and 39 are secured in position in the casing by welding or other suitable means.

The inner plate 21 is mounted on the bottom 12 of the tray and a flange 44 on the lower end is secured to the tray, such as by welding. The plate is retained in an upwardly extended position with a diagonally disposed brace 45 which, as illustrated in Figure 3, may be formed by folding the upper end of the plate 21 at the point 46 with a section 47 of the plate extended downwardly to form the brace 45 and with a flange 48 on the lower end of the brace secured to the upper surface of the plate 12 such as by welding. The upper portion of the plate 21 is provided with a vertically disposed centrally positioned slot 49 that straddles the partition 11 and, as illustrated in Figure 5, the upper portion of the inner plate 21 provides bearings for arms 50 and 51 which extend through the openings 19 and 20, respectively, of the plate.

The forward end of the plate 12 forming the bottom of the tray extends upwardly, particularly as illustrated in Figure 8, forming a tray front 52 that is positioned in a recess 53 in the face plate or head 13 and, as illustrated in Figures 7 and 8, a liner 54 is positioned between the tray front and face plate. The face plate 13 is secured to the tray front 52 with the screws 17 and 18 and also with a screw 55 that holds the knob 14 on the outer surface of the face plate. The lower edge of the liner 54 is also secured in position in the face plate with screws 56 and 57, as shown in Figures 3 and 6.

The outer ends of the loops 15 and 16 are provided with eyes 58 and 59, as shown in Figure 9, through which the screws 17 and 18 extend, respectively, and with the arms 50 and 51 at the opposite ends of the loops freely mounted in the openings 19 and 20 of the inner plate 21 the loops are free to twist or rotate as the ends 22 and 23 slide in the slot 24.

With the edges of the bottom plate 12 of the tray extended through the hold down angles 38 and 39, the tray is free to slide outwardly and inwardly and with the extended ends of the spring clips 42 and 43 positioned to engage the ends of the hold down or clip angles outward movement of the tray is limited.

With the parts assembled as illustrated and described, the casing 10 is adapted to be positioned in an opening in an instrument panel of a motor vehicle and when it is desired to provide a holder for a cup, glass, bottle, or other such device, the tray is drawn outwardly to the positions illustrated in Figures 7 and 8 whereby the loops 15 and 16 move upwardly to form a substantially circular holder for a container positioned upon the plate or bottom 12 of the tray. When use of the device is not desired, the tray is moved inwardly into the casing and in the inward movement the ends 22 and 23 of the loops follow the slot 24 folding the loops 15 and 16 downwardly to the positions shown in Figure 5 whereby the device is adapted to be nested in the casing.

It will be understood that modifications, within the scope of the appended claims, may be made in the design and arrangement of the parts without departing from the spirit of the invention.

What is claimed is:

1. A container holder comprising an elongated casing, rectangular shaped in cross section, adapted to be positioned in an instrument panel of a motor vehicle, a tray slidably mounted in the casing, loops pivotally mounted on the tray, a partition having a slot with an inclined section therein in the casing and mounted on the longitudinal center thereof, said loops having right angularly disposed ends extended into the slot of the partition and positioned to follow the inclined section of the slot, for folding the loops to nested positions in the tray upon movement of the tray into the casing and for opening the loops to horizontally disposed positions upon outward movement of the tray in the casing.

2. A container holder comprising an elongated casing, rectangular shaped in cross section, adapted to be positioned in an instrument panel of a motor vehicle, a tray slidably mounted in the casing, means limiting outward movement of the tray in the casing, loops pivotally mounted on the tray, a partition having a slot with an inclined section therein in the casing and mounted on the longitudinal center thereof, said loops having right angularly disposed ends extended into the slot of the partition and positioned to follow the inclined section of the slot, for folding the loops to nested positions in the tray upon movement of the tray into the casing and for opening the loops to horizontally disposed positions upon outward movement of the tray in the casing.

3. In a container holder for use in instrument panels of motor vehicles, the combination which comprises an elongated casing, rectangular shaped in cross section and having a partition with a slot having a sloping section therein fixedly mounted therein, a tray having a bottom with a face plate on the outer end and a vertically disposed inner plate spaced from the inner end slidably mounted in the casing, and substantially semi-circular loops pivotally mounted on the face plate and in the inner plate of the tray, said loops having ends extended into the slot of the partition of the casing whereby upon outward movement of the tray the loops are actuated by the ends thereof following the sloping section of the slot to horizontally disposed positions for retaining a container on the tray and upon inward movement of the tray the loops are actuated by the ends thereof in a sloping section of the slot to nested positions in the tray.

4. In a container holder for use in instrument panels of motor vehicles, the combination which comprises an elongated casing, rectangular shaped in cross section and having a partition with a slot having a sloping section therein fixedly mounted therein, a tray having a bottom with a face plate on the outer end and a vertically disposed inner plate spaced from the inner end slidably mounted in the casing, and substantially semi-circular loops pivotally mounted on the face plate and in the inner plate of the tray, said loops having ends extended into the slot of the partition of the casing whereby upon outward movement of the tray the loops are actuated by the ends thereof following the sloping section of the slot to horizontally disposed positions for retaining a container on the tray and upon inward movement of the tray the loops are actuated by the ends thereof in the sloping section of the slot to nested positions in the tray, said casing having guide angle bars positioned in opposite sides thereof and the lower edges of said tray being positioned to slide below said angle bars for retaining the tray in an extended position.

5. In a container holder for use in instrument panels of motor vehicles, the combination which comprises an elongated casing, rectangular shaped in cross section and having a partition with a slot having a sloping section therein fixedly mounted therein, a tray having a bottom with a face plate on the outer end and a vertically disposed inner plate spaced from the inner end slidably mounted in the casing, substantially semi-circular loops pivotally mounted on the face plate and in the inner plate of the tray, said loops having ends extended into the slot of the partition of the casing whereby upon outward movement of the tray the loops are actuated to horizontally disposed positions for retaining a container on the tray and upon inward movement of the tray the loops are actuated to nested positions in the tray, said casing having guide angle bars positioned in opposite sides thereof and the lower edges of said tray being positioned to slide below said angle bars for retaining the tray in an extended position, and spring clips carried by edges of the tray and positioned to engage said guide angles for limiting outward movement of the tray.

6. In a container holder, the combination which comprises an elongated casing, rectangular shaped in cross section and having a centrally positioned longitudinally disposed partition extended downwardly from the upper end and having clip angles on inner surfaces of side walls and spaced from the lower end, said partition having a slot with an inclined section therein extended therethrough, a tray having a bottom with edges thereof positioned to slide below the guide angles on the inner surfaces of the sides of the casing and having a face plate extended upwardly from the outer end, spring clips positioned at the sides and on the inner end of the bottom of the tray for limiting outward movement of the tray, and substantially semi-circular loops pivotally mounted on the tray and having extended ends adapted to travel in the slot of the partition of the casing for actuating the loops to horizontally disposed positions as the tray is moved outwardly and to nested positions as the tray is moved inwardly of the casing.

References Cited in the file of this patent

UNITED STATES PATENTS 1,793,765   Ven Roy et al. _____ Feb. 24, 1931